Oct. 11, 1960   A. E. ENGLUND, JR   2,956,240
PROTECTION ARRANGEMENT IN TRANSISTOR CIRCUIT
Filed April 30, 1959
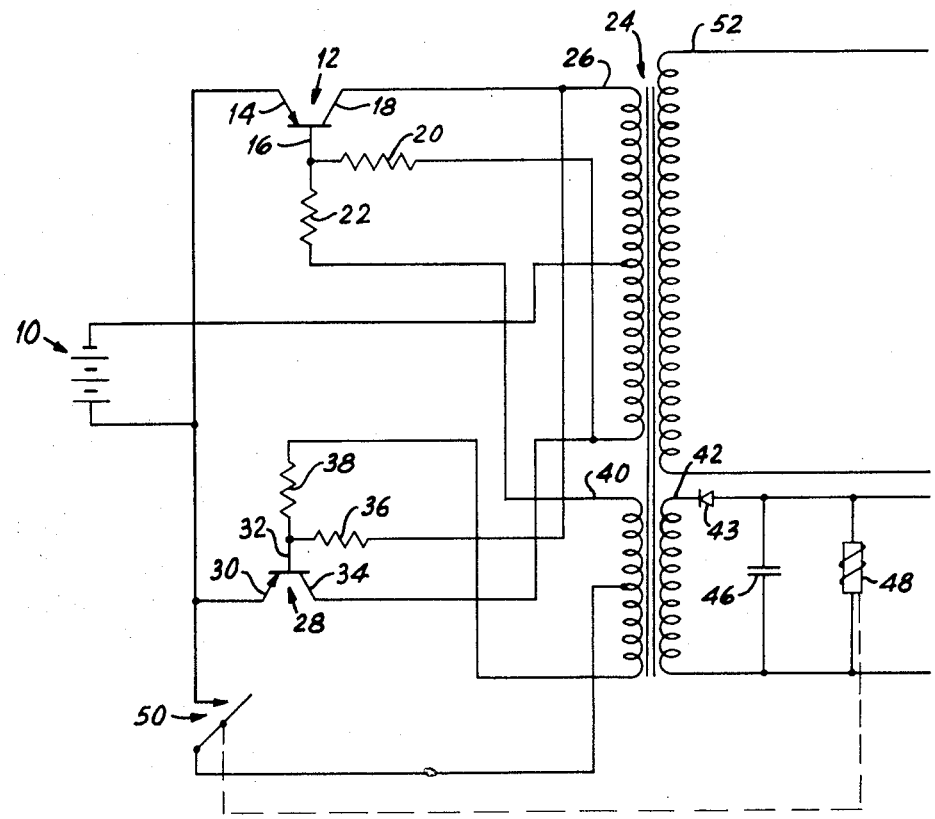
INVENTOR.
ARVID E. ENGLUND, JR.
BY Isidore Match
ATTORNEY United States Patent Office 2,956,240
Patented Oct. 11, 1960

2,956,240

PROTECTION ARRANGEMENT IN TRANSISTOR CIRCUIT

Arvid E. Englund, Jr., Lynchburg, Va., assignor to General Electric Company, a corporation of New York Filed Apr. 30, 1959, Ser. No. 809,944

8 Claims. (Cl. 331—62)

This invention relates to control devices in electric circuits. More particularly it relates to a device for protecting the transistors in a circuit for converting a direct current input to an alternating current output from injury or destruction due to reversal of the polarity of the direct current input source.

It is well known that transistors, which comprise emitter, base and collector electrodes, have characteristic biasing arrangements for proper operation. Thus, for example, in the point contact or in the PNP type junction transistor, for proper operation, the emitter electrode is biased positive with respect to the base electrode and the base electrode is biased positive with respect to the collector electrode. In the case of an NPN junction transistor, the biasing arrangement is the reverse of the above.

If by some inadvertence, the polarity of the direct current input source is reversed, the transistor will still operate to some extent, the emitter electrode effectively performing as the collector electrode and vice versa. It can readily be appreciated that such undesired reversal of the direct current source polarity can lead to the transistors being operated by current which greatly exceeds their current ratings with consequent irreparable injury thereto or total destruction thereof.

In transistorized power supplies, especially in field or mobile devices which are battery powered, there is generally provided an inverter circuit capable of producing relatively high quantities of alternating current power from the direct current power supplied thereto. The inverter circuit used for providing the alternating current power is an oscillator for converting the direct current input to an alternating current output and the normal biasing arrangement of the transistors included therein is one which permits relatively high currents to flow in the transistors. Quite often, the arrangement may include circuit modifications which permit even greater currents to flow depending upon the power demand of the load circuit. Should the battery polarity be inadvertently reversed in such a power supply circuit, the transistors may cease to function as active elements in an oscillator circuit but due to the inherent capability of the emitter and the collector electrodes to change their functions respectively to collector and emitter electrodes, the transistors may continue to function as amplifiers. If the biasing arrangements for the transistors are such that, upon the polarity reversal, the current through the transistors substantially exceeds their current ratings, they are rapidly injured and quite often totally destroyed.

It is accordingly a primary object of this invention to provide a transistorized power supply circuit for converting a direct current input to an alternating current output which includes means for protecting the transistors therein from injury due to the reversal of the polarity of the direct current input.

It is a further object to provide a transistorized power supply circuit as set forth in the preceding object wherein such protecting means embodies means for controlling the biasing arrangement of the transistors when such polarity reversal does occur.

Generally speaking, and in accordance with the invention, there is provided a circuit for converting the power from a direct current source to an alternating current output comprising first and second transistors, each transistor comprising an emitter, a collector and a base electrode. Biasing potentials are applied to the electrodes of the transistors from the direct current source to permit a chosen level of current to flow therethrough. A transformer is provided having a primary winding connected across the collectors and means are included for feeding back a portion of the current output from a collector electrode of one transistor to the base electrode of the other transistor and from the collector electrode of the other transistor to the base of the one transistor. A second winding in transformer arrangement is provided with the primary winding which when placed in circuit with the direct current input source causes a change in the biasing potentials on the electrodes of the transistors to enable the feeding back of greater amounts of current to the respective base electrodes, thereby permitting a higher level of current to flow through the transistors when the direct current source is placed in circuit with the second winding. A third winding is provided in transformer arrangement with the second winding the third winding having means in circuit therewith which is responsive to a current flowing therethrough for inserting the direct current source in circuit with the second winding and a fourth output winding is provided in transformer arrangement with the first primary winding.

The features of this invention which are believed to be new are set forth with particularity in the appended claims. The invention itself, however, may best be understood by reference to the following description when taken in conjunction with the accompanying drawing which shows an embodiment of a transistorized power supply circuit according to the invention.

Referring now to the drawing, there is shown a transistorized power supply circuit in accordance with the invention for converting a direct current input to an alternating current output. In the circuit there is provided a transistor 12 comprising an emitter electrode 14, a base electrode 16 and a collector electrode 18. A second transistor 28 is provided which includes an emitter electrode 30, a base electrode 32 and a collector electrode 34. The positive terminal of a source 10, which may be a battery, is directly connected to emitter electrodes 14 and 30. Connected across the collector electrodes 18 and 34 is the primary winding 26 of a transformer 24. A portion of the output at collector electrode 18 is fed back to base electrode 32 through resistor 36 and a portion of the output from collector electrode 34 is fed back to base electrode 16 through a resistor 20.

A winding 40 in transformer arrangement with winding 26 has one terminal connected to base electrode 16 through a resistor 22 and another terminal connected to base electrode 32 through a resistor 38. A winding 42 in transformer arrangement with winding 40 is provided having a capacitor 46 and an electromagnetic relay 48 connected thereacross as shown, a diode 43 which may be of the semi-conductor type being included in circuit between the junction point of capacitor 46 and the upper end of winding 42.

Associated with relay 48 are contacts 50 which are normally in the open position when relay 48 is in the unenergized state. As is shown, when relay contacts 50 close due to the energization of relay 48, the positive terminal of battery 10 is connected to an intermediate point on winding 40, the negative terminal of battery 10 being connected to an intermediate point on winding 26. The output of the circuit is developed across secondary winding 52. With the circuit arrangement as shown transistors 12 and 28 may be of the point contact or PNP junction type power transistors. However, NPN power transistors can be just as readily utilized, there merely being required a reversing of the battery polarity.

It is seen that that portion of the circuit which includes the transistors 12 and 28, winding 26, winding 52, and battery 10 is the conventional transistorized inverter circuit. The function of windings 40 and 42, and relay 48 with its associated contacts 50 will be explained in conjunction with a description of the operation of the invention.

In operation and in accordance with the operation of transistorized inverter circuits, because of the feedback arrangement of collector electrode 18 to base electrode 32 and collector electrode 34 to base electrode 16, with the application of the direct current input to the circuit, eventually an alternating current will appear across primary winding 26 of transformer 24 and be transformed to the secondary winding 52, the voltage output across secondary winding 52 depending upon the secondary to primary turns ratio. Since the output at collector electrode 18 is in phase with the input to base electrode 32 and since the output at collector electrode 34 is in phase with the input to base electrode 16, the circuit functions as an oscillator and the alternating current flowing through primary winding 26 causes transformer action. With the development of the alternating current through the circuit, an alternating current will also flow through winding 40. This causes an alternating current to flow through winding 42, which because of the filter arrangement of diode 43 and capacitor 46 results, in a rectified current energizing relay 48. The energization of relay 48 causes the closing of contacts 50 with the application of the positive potential from source 10 to the intermediate point, preferably the center on winding 40. With such application, bias is now applied from the opposite ends of winding 40 to base electrodes 16 and 32 through resistors 22 and 38 respectively. If resistor 22 is chosen to have a lesser value than resistor 20 and resistor 38 is chosen to have a lesser value than resistor 36, it is seen that with contacts 50 closed, both the potentials applied to base electrodes 12 and 32 and the current fed back thereto will be greater than would be the case if contacts 50 remained open. Thus, with relay 48 in the circuit of winding 42 as shown in conjunction with contacts 50, a higher alternating current output is provided in the circuit.

Now let it be assumed that for some reason or other the polarity of battery 10 is reversed. In this situation, collector electrode 18 functions as an emitter electrode, emitter electrode 14 functions as a collector electrode, emitter electrode 30 functions as a collector electrode and collector electrode 34 functions as an emitter electrode and transistors 12 and 28 function as amplifiers. However, because the feedback from collector electrode 18 to base electrode 32 and the feedback from collector electrode 34 to base electrode 16 is not now of the proper phase to provide in phase feedback arrangements, the circuit does not function as an oscillator. Since the circuit does not function as an oscillator in this situation, no alternating current flows through windings 26 or 40 and accordingly no current flows through winding 42 to permit relay 48 to be energized. Thus, contacts 50 remain open. If contacts 50 were to be closed, say by physical means, at the time that an inadverent reversal in the polarity of source 10 occurs, and if resistors 22 and 38 have been chosen to have lower values than resistors 20 and 36 respectively, then the biasing arrangements of transistors 12 and 28 could be so affected that although they function as amplifiers, levels of current are permitted to flow therethrough greatly exceeding their rated levels and the transistors would conduct so heavily that they would be destroyed in a matter of seconds.

As a matter of fact, the circuit of this invention can function as an oscillator without resistors 20 and 36 with contacts 50 closed and, the absence of these resistors, while permitting the circuit to function as a high power oscillator safely, could cause almost immediate destruction of the transistors should the polarity of source 10 be reversed.

Thus, it is seen that by providing relay 48 in winding in the circuit of winding 42 together with contacts 50 between the positive terminal of battery 10 and the intermediate point on winding 40, the circuit is protected against the destructive effects of battery polarity reversal and the only way that any damage could occur would be if contacts 50 were physically closed.

While there has been shown and described a particular embodiment of this invention it is apparent that other forms and embodiments may be made and it is contemplated in the claims to cover any such modifications as fall within the scope of the invention.

What is claimed is:

1. A circuit for converting the input power from a direct current source to an alternating current output comprising a first transistor having first emitter, base and collector electrodes, a second transistor comprising second emitter, base and collector electrodes, a transformer comprising a first winding connected across said collector electrodes, means for applying biasing potentials to said electrodes from said direct current source to provide a given level of current through said transistors, means for feeding back a portion of the output from said first collector electrode to said second base electrode, means for feeding back a portion of the output from said second collector electrode to said first base electrode, a second winding in transformer arrangement with said first winding, means for applying biasing potentials to said electrodes through said second winding and for applying feedback quantities through said second winding to said respective bases having values to cause a greater amount of current than said given level to flow through said transistors when said secondary winding is in circuit with said direct current source, a third winding in transformer arrangement with said second winding, and means in circuit with said third winding and responsive to a current flowing therethrough for placing said direct current source in circuit with said second winding.

2. A circuit for converting the input power of a direct current source to an alternating current output comprising a first transistor having first emitter, base, and collector electrodes, a second transistor having second emitter, base, and collector electrodes, means for applying biasing potentials from said source to said electrodes, a transformer comprising a first winding connected across said collector electrodes, said biasing potentials being so chosen as to provide a given level of current through said transistors, means for feeding back a portion of the output from said first collector electrode to said second base electrode, means for feeding back a portion of the output from said second collector electrode to said first base electrode, a second winding in transformer arrangement with said first winding, said second winding having one end coupled to said first base electrode and its other end coupled to said second base electrode, said second winding when placed in circuit with said direct current source applying biasing potentials to said electrodes and feedback quantities to said respective bases such that a level of current higher than said given level is caused to flow through said transistors, a third winding in transformer arrangement with said second winding, means in circuit with said third winding and responsive to a current flowing therethrough for inserting said second winding into circuit with said direct current source, and a fourth winding in transformer arrangement with said first winding for providing the alternating current output from said circuit.

3. A circuit for converting the input power from a direct current source to an alternating current output comprising a first transistor comprising first emitter, base, and collector electrodes, a second transistor comprising second emitter, base, and collector electrodes, means for applying biasing potentials from said source to said electrodes, said biasing potentials being chosen so as to provide a given level of current through said transistors, first and second resistors, means for feeding back a portion of the current output of said first collector electrode to said second base electrode through said second resistor, means for feeding back a portion of the output current of said second collector electrode to said first base electrode through said first resistor, a transformer comprising a first winding connected across said collector electrodes, a second winding in transformer arrangement with said first winding, third and fourth resistors, one terminal of said second winding being connected to said first base electrode through said third resistor, the other terminal of said second winding being connected to said second base electrode through said fourth resistor, said first resistor having a greater value than said third resistor and said second resistor having a greater value than said fourth resistor whereby upon placing said second winding into circuit with said direct current source, the biasing potentials and the current fed back to said respective bases through said second winding are such as to permit a level of current through said transistors greater than said given level, a third winding in transformer arrangement with said second winding, means in circuit with said third winding and responsive to a current flowing therethrough for inserting said direct current source in circuit with said second winding, and a fourth winding in transformer arrangement with said first winding for developing the alternating current output of said circuit.

4. A circuit for converting the input power of a direct current source to an alternating current output comprising a first transistor having first emitter, base, and collector electrodes, a second transistor having second emitter, base and collector electrodes, a transformer comprising a first winding connected across said collector electrodes, a battery, means for connecting one terminal of said battery to said emitter electrodes, the other terminal of said battery being connected to an immediate point on said first winding, first and second resistors, means for applying a portion of the current output of said first collector electrode to said second base electrode through said second resistor, means for applying a portion of the current output of said second collector electrode to said first base electrode through said first resistor, said first and second resistors being chosen to have values whereby the biasing potentials applied to said electrodes permits a given level of current to flow through said transistors, a third resistor having a value smaller than said first resistor, a fourth resistor having a value smaller than said second resistor, a second winding in transformer arrangement with said first winding, one terminal of said second winding being connected to said first base electrode through said third resistor, the other terminal of said second winding being connected to said second base electrode through said fourth resistor, the placing of an intermediate point on said second winding in circuit with said direct current source causing the application of biasing potentials and the feeding back of quantities of currents to said first and second base electrodes whereby a level of current greater than said given level is caused to flow through said transistors, a third winding in transformer arrangement with said second winding, a coil in circuit with said third winding and energizable in response to a current flowing through said third winding, the energization of said coil inserting said intermediate point on said second winding into circuit with said direct current source and a fourth winding in transformer arrangement with said first winding for developing the output power of said circuit.

5. A circuit for converting the input power from a direct current source to an alternating current output comprising a first transistor having first emitter, base, and collector electrodes, a second transistor having second emitter, base, and collector electrodes, a battery, a transformer comprising a first winding connected across said first and said second collector electrodes, means for connecting one terminal of said battery to said emitter electrodes, means for connecting the other terminal of said battery to an intermediate point on the said first winding, a first resistor, a second resistor, means for applying a portion of the output current at said first collector electrode to said second base electrode through said second resistor, means for applying a portion of the output current of said second collector electrode to said first base electrode through said first resistor, the values of said first and second resistors being chosen such that a given level of current flows through said transistors, a third resistor, a fourth resistor, a second winding in transformer arrangement with said first winding, one terminal of said second winding being connected to said first base electrode through said third resistor, the other terminal of said second winding being connected to said second base electrode through said fourth resistor, said third resistor having a value less than said first resistor and said fourth resistor having a value less than said third second resistor, the values of said second and fourth resistors being so chosen that upon the placing of a terminal of said battery in circuit with an intermediate point on said second winding, a current level higher than said given level is caused to flow through said transistors, a pair of normally open contacts between said terminal and said intermediate point, a third winding in transformer arrangement with said second winding, an electromagnetic coil connected across said third winding and energizable by a current through said third winding, the energization of said coil by said current through said third winding causing the closing of said contacts to place said terminal in circuit with said intermediate point, and a fourth wnding in transformer arrangement with said first winding for developing the output of said circuit.

6. A circuit as defined in claim 4 wherein said third winding further includes a capacitor in shunt therewith and a rectifier in series arrangement with one end of said coil and one terminal of said third winding.

7. A cirlcuit as defined in claim 5 wherein said transistors are of the point contact type and wherein the positive terminal of said battery is connected to said emitter electrodes and to said intermediate point upon the closing of said contacts due to the energization of said coil.

8. A circuit as defined in claim 5 wherein said transistors are PNP type junction transistors and wherein said positive terminal of said battery is connected to said emitter electrodes and upon the closing of said contacts due to the energization of said coil, is connected to said intermediate point on said second winding.

References Cited in the file of this patent

UNITED STATES PATENTS

| | | |
|---|---|---|
| 1,975,812 | Wallace | Oct. 9, 1934 |
| 2,852,730 | Magnuski | Sept. 16, 1958 |